(12) United States Patent
Yusuf

(10) Patent No.: US 8,205,524 B2
(45) Date of Patent: Jun. 26, 2012

(54) TORQUE LIMITING HANDLE ASSEMBLY

(75) Inventor: Shaffeek A. Yusuf, Waterloo (CA)

(73) Assignee: Leggett & Platt Canada Co., Waterloo, Ontario (CA)

( * ) Notice: Subject to any disclaimer, the term of this patent is extended or adjusted under 35 U.S.C. 154(b) by 986 days.

(21) Appl. No.: 12/051,124

(22) Filed: Mar. 19, 2008

(65) Prior Publication Data

US 2009/0235775 A1    Sep. 24, 2009

(51) Int. Cl.
*B62D 1/06* (2006.01)
*G05G 1/10* (2006.01)
*G05G 5/06* (2006.01)
(52) U.S. Cl. .............................. 74/557; 74/553; 74/531
(58) Field of Classification Search .............. 74/531, 74/553, 557; 297/303.5; 215/216; 251/266; 200/4; 16/441
See application file for complete search history.

(56) References Cited

U.S. PATENT DOCUMENTS

| | | | | |
|---|---|---|---|---|
| 3,503,586 A * | 3/1970 | Bordes | | 251/266 |
| 3,880,536 A * | 4/1975 | Petrus | | 403/361 |
| 4,175,220 A * | 11/1979 | Johnston et al. | | 200/4 |
| 4,452,363 A * | 6/1984 | Davis | | 215/216 |
| 4,593,430 A * | 6/1986 | Spangler et al. | | 16/441 |
| 5,083,477 A * | 1/1992 | Geil | | 74/553 |
| 5,152,580 A * | 10/1992 | Stumpf | | 297/303.5 |
| 6,085,612 A * | 7/2000 | Thorn et al. | | 74/531 |
| 6,296,312 B1 * | 10/2001 | Congleton et al. | | 297/411.35 |
| 7,140,271 B2 * | 11/2006 | Hall | | 74/553 |
| 2011/0061489 A1 * | 3/2011 | Bulin et al. | | 74/553 |

OTHER PUBLICATIONS

Figs. 1 and 2 showing a two-piece handle assembly.

* cited by examiner

*Primary Examiner* — Vinh T. Luong
(74) *Attorney, Agent, or Firm* — Shook, Hardy & Bacon L.L.P.

(57) ABSTRACT

A torque limiting handle assembly is described. One member of a two member torque limiting handle assembly has resiliently depending legs extending about its rotational axis. The second member has features arranged such that on rotation of the first member, the features contact the legs so that when a reaction torque of the second member is less than a threshold value, the second member rotates with the first member and when a reaction torque of the second member is greater than the threshold value, the legs resiliently deflect so that the features simply pass across the legs and the second member does not rotate with the first member.

16 Claims, 4 Drawing Sheets

TORQUE LIMITING HANDLE ASSEMBLY

BACKGROUND

This invention relates to a torque limiting handle assembly.

A chair control may have a handle which may be rotated by a user to control an adjustment mechanism of the chair. For example, a rotational handle may be employed to control the tension on a spring, which spring resists tilting of the seat or backrest. With any such mechanism there is a risk that the handle may be over-torqued which could damage or jam the mechanism. To avoid this result, it is known to use a two-piece handle assembly connected by a spring loaded ratchet. More specifically, as shown in FIGS. 1 and 2, one piece of the handle assembly acts as the handle 12 and the second piece as a connector 14 connecting to the remainder of the mechanism. The connector 14 has a face gear 16 that meshes with a face gear 18 of the ratchet 20. A spring 22 backstopped by a plate 24 affixed to the connector (by screws 26) urges the ratchet face gear 18 against the connector face gear 16. The handle 12 is keyed to the ratchet 20 so that rotating the handle rotates the ratchet face gear 18. With this arrangement, if the torque on the handle 12 exceeds a threshold (in either rotational direction), the ratchet 20 simply ratchets to allow the handle to turn while the connector 14 remains stationary. Thus, over-torquing of the handle assembly is avoided.

A drawback with such a handle assembly is that it is of relatively complicated construction.

This invention seeks to provide an improved torque limiting handle assembly.

SUMMARY

One member of a two member torque limiting handle assembly has resiliently depending legs extending about its rotational axis. The second member has features arranged such that on rotation of said first member, the features contact the legs so that when a reaction torque of the second member is less than a threshold value, the second member rotates with the first member and when a reaction torque of the second member is greater than the threshold value, the legs resiliently deflect so that the features simply pass across said legs and the second member does not rotate with the first member.

According to the present invention there is provided a torque limiting handle assembly, comprising: a first member having a handle for turning by a user; a second member having a connection end for connection to a member to be torqued; one member of said first member and said second member having a plurality of legs resiliently depending from a body, said legs extending about a rotational axis of said body; another member of said first member and said second member having a coupling section extending along said rotational axis of said body, said coupling section having features arranged such that on rotation of said first member, said features contact said legs so that when a reaction torque of said second member is less than a threshold value, said second member rotates with said first member and when a reaction torque of said second member is greater than said threshold value, said legs resiliently deflect so that said features pass across said legs and said second member does not rotate with said first member.

According to another aspect of the present invention, there is provided a torque limiting handle assembly, comprising: an annular handle member for turning by a user; a shaft member having a rotational axis, said shaft member having a connection end for connection to a member to be torqued and an opposite legged end with a plurality of resiliently depending legs, said legs extending about said rotational axis, said legged end of said shaft member disposed within said handle member such that said legs are within said handle member; said annular handle member having an inside wall with features arranged such that on rotation of said handle member, said features contact said legs so that when a reaction torque of said shaft member is less than a threshold value, said shaft member rotates with said handle member and when a reaction torque of said shaft member is greater than said threshold value, said legs resiliently deflect so that said features pass across said legs and said shaft member does not rotate with said handle member.

Other features and advantages will become apparent from the following description in conjunction with the drawings.

BRIEF DESCRIPTION OF THE DRAWINGS

In the figures which illustrate example embodiments of the invention.

DETAILED DESCRIPTION

Figure 1:
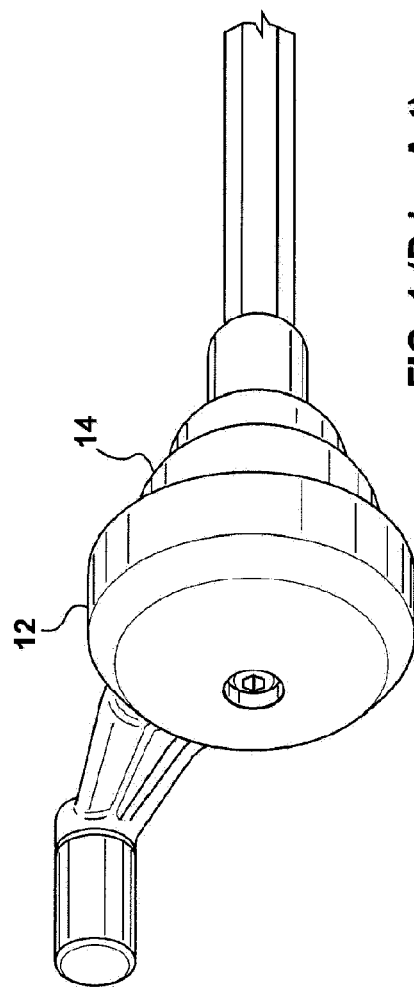
FIG. 1 is a perspective view of a known handle assembly.
Figure 2:
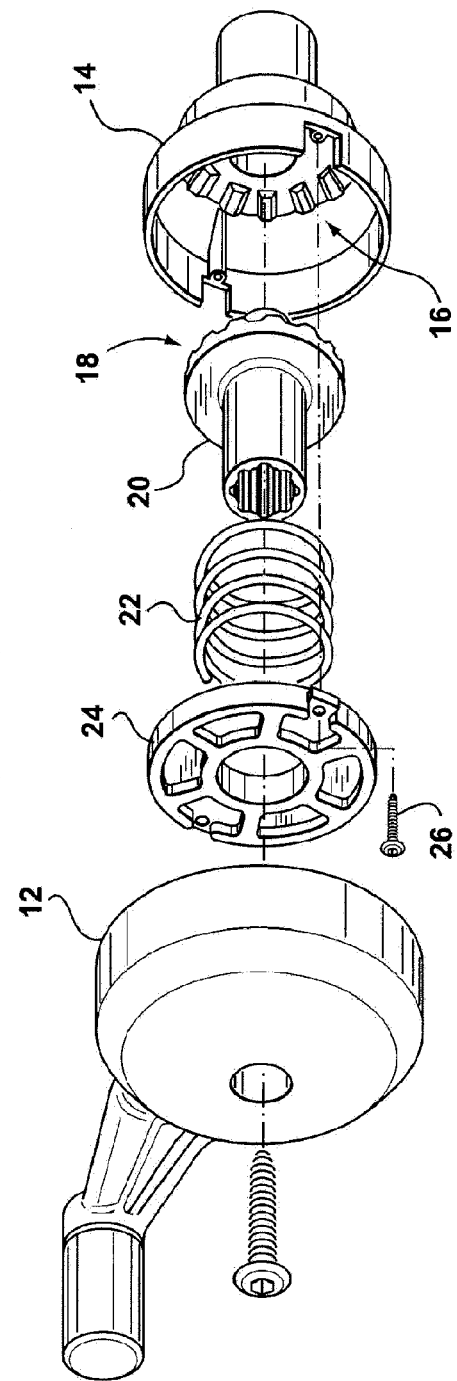
FIG. 2 is an exploded view of the handle assembly of FIG. 1.
Figure 3:
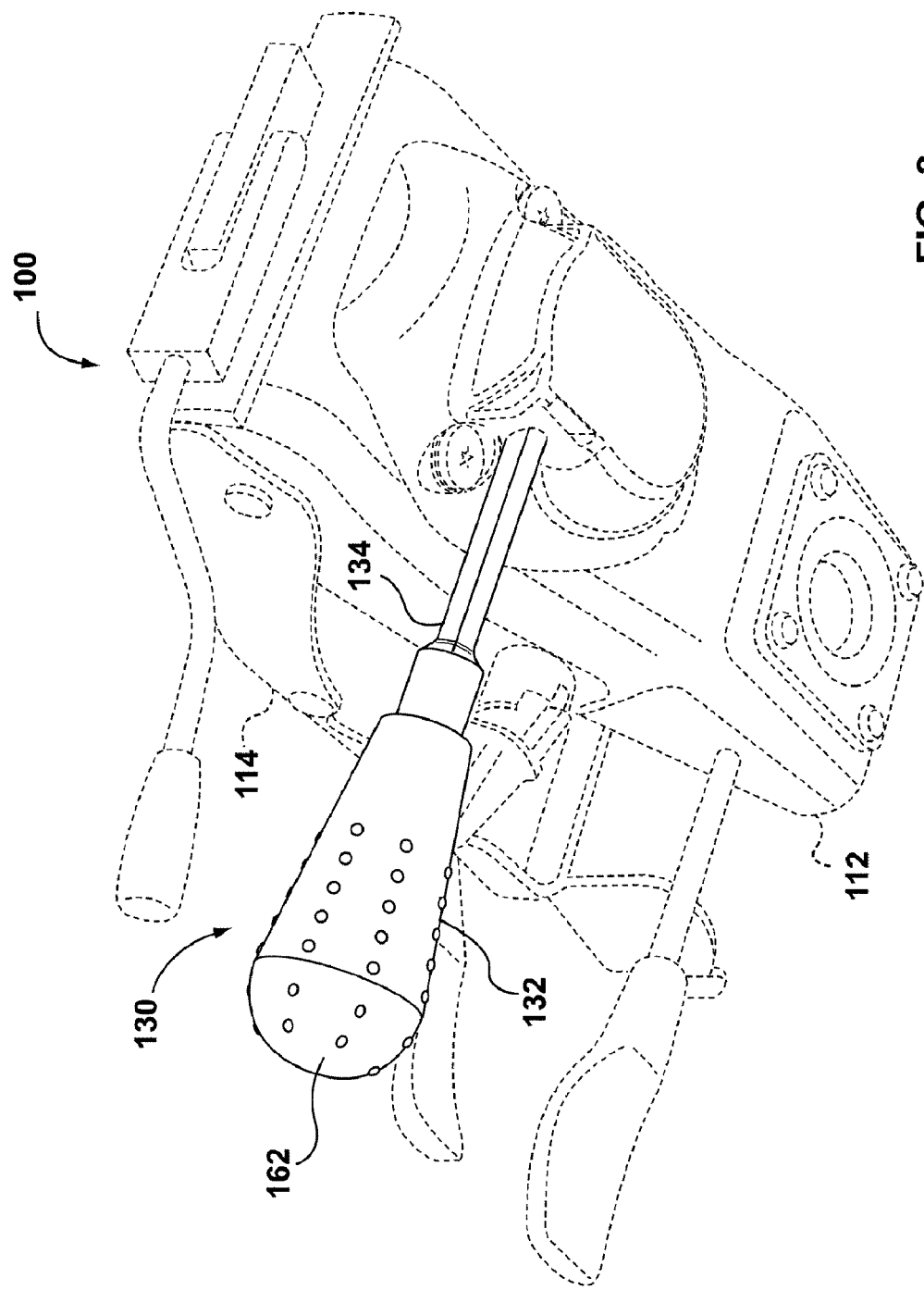
FIG. 3 is a perspective view of a chair control incorporating a handle assembly made in accordance with an embodiment of the invention.

Turning to FIG. 3, a chair control 100 has a main frame 112 with one end of a seat plate 114 pivotably joined to the main frame 112. A spring (not shown) is disposed between a spring backstop (not shown) carried by the main frame 114 and the seat plate in order to resist tilting of the seat plate. The position of the spring backstop may be adjusted by an adjustment mechanism in order to change the compression of the spring, and therefore the tension applied by the spring. The adjustment mechanism is operated by torque limiting handle assembly 130.

Figure 4:
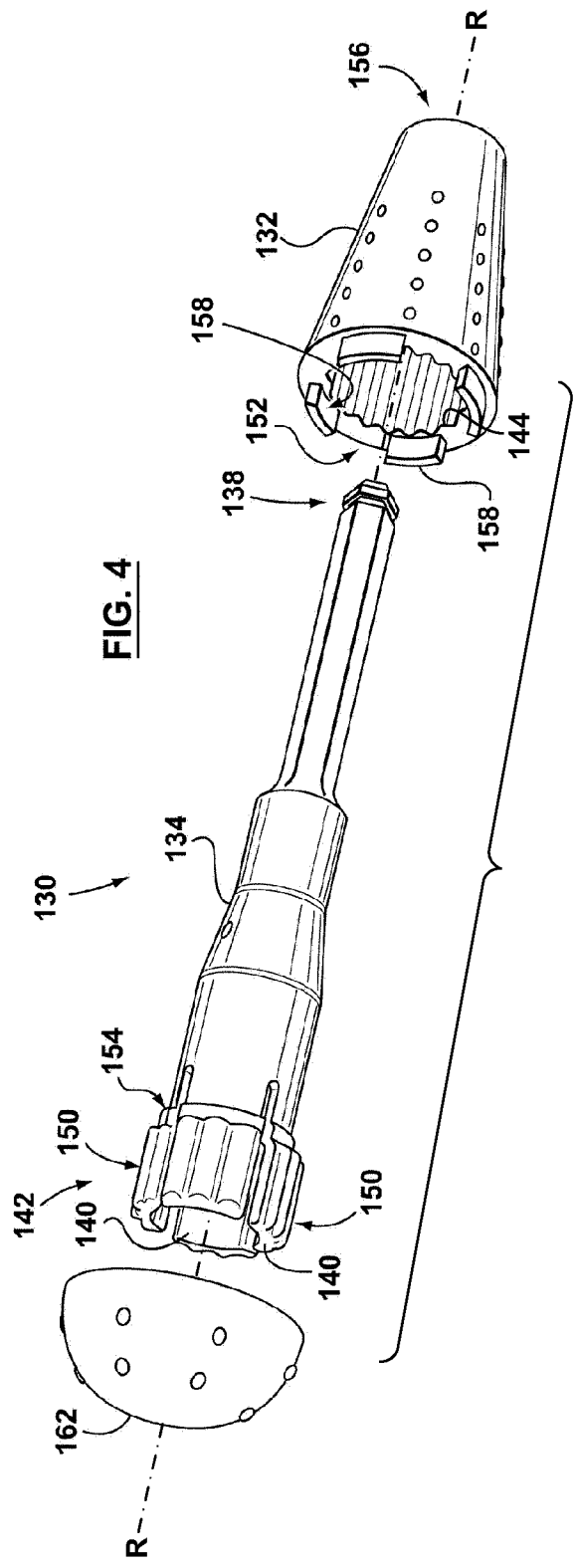
FIG. 4 is an exploded perspective view of the handle assembly of FIG. 3.
Figure 5:
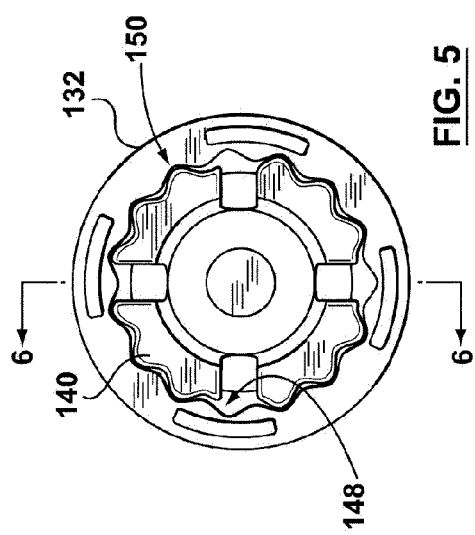
FIG. 5 is an end view of the assembled handle assembly absent the cap in accordance with an embodiment of the invention.
Figure 6:
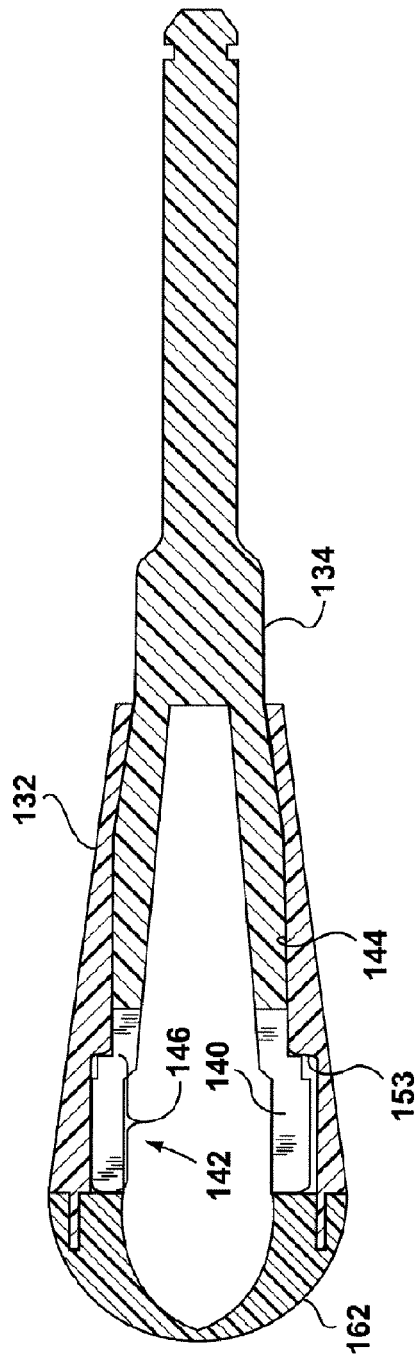
FIG. 6 is a cross-sectional view of a handle member of the handle assembly taken along the line 6-6 depicted in FIG. 5 in accordance with an embodiment of the invention.

Referencing FIGS. 4 to 6, the handle assembly 130 has an annular handle member 132 and a shaft member 134 with a rotational axis R. The shaft member has a connection end 138 for connection to the remainder of the spring tension adjustment mechanism. A plurality of legs 140 resiliently depend from the opposite end 142 of the shaft member and extend about the rotational axis R of the shaft member 134. When assembled, the legged end 142 of the shaft member 134 is disposed within the handle member 132 such that the legs 140 face a coupling section 146 of inside wall 144 of the annular handle member.

Coupling section 146 is a portion of inside wall 144 that is featured. More specifically, the coupling section has undulations 148. The outside surface of each leg 140 also has undulations 150. The shaft member 134 and handle member 132 are sized such that undulations 150 of each leg 140 extend within undulations 148 of coupling section 146. In consequence, on rotation of the handle member 132, the undulations 148 of the coupling section 146 contact the legs 140 so that when a reaction torque of the shaft member 134 is less than a threshold value, the shaft member 134 rotates with the handle member 132. On the other hand, when a reaction torque of the shaft member 134 is greater than this threshold value, the legs 140 resiliently deflect so that the undulations 148 of the coupling section 146 pass across the legs 140 and the shaft member 134 does not rotate with the handle member 132.

Coupling section 146 extends from an open end 152 of the handle member 132 to a shoulder 153 of inside wall 144. The shaft member 134 has a shoulder 154 toward the base of legs 140.

To assemble handle assembly 130, the connection end 138 of the shaft member 134 is inserted into the open end 152 of the handle member 132 and passed through the opposite open end 156 of the handle member 132 until the shoulder 154 of the shaft member 134 seats against the shoulder 153 of the inside wall 144 of the handle member 132. In this position, the legs 140 of the shaft member 134 face coupling section 146 of the handle member 132.

Figure 7:
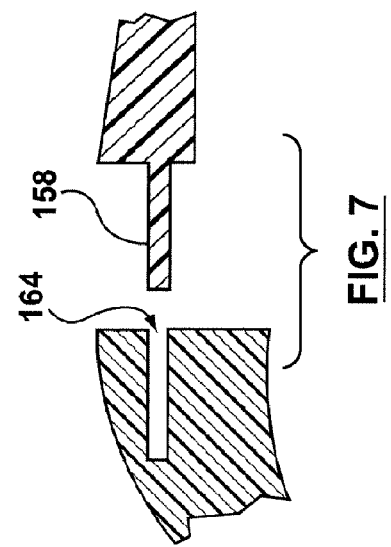
FIG. 7 is a exploded cross-sectional fragmentary view of a portion of the handle assembly of FIG. 3.

Turning now additionally to FIG. 7, a number of tabs 158 project axially from the open end 152 of the handle member 132. A cap 162 has a like number of tab-receiving openings 164. The cap 162 may be press fit over the tabs 158. By holding the cap 162 to the handle member 132, the shaft member 134 may be retained within the handle member 132.

The undulations 150 of each leg 140 extend from the outer end of the leg 140 and terminate part way along the leg 140 spaced from the shoulder 154.

The handle member 132 is a unitary single piece of material. The shaft member 134 is also a unitary single piece of material. And the cap 162 is also a unitary single piece of material. Each of these members 132, 134, 162 may be fabricated of any suitable material (such as polypropelene or another plastic material, glass filled nylon, or even steel), to provide the resilience which allows the legs 140 to resiliently deflect. The threshold torque applied by the handle member 132 beyond which the legs 140 will deflect may be controlled by the selection of the width and length of the legs 140 and the thickness of the material.

Advantageously, the described torque limiting handle assembly 130 has only three parts which may be assembled without fasteners. Consequently, the handle assembly 130 may be manufactured at relatively low cost.

In another embodiment not depicted in the drawings, the featured surface of the legs of the legged end of the shaft member is the inner surface of each leg rather than the outer surface. In this instance, the coupling section of the handle member is a cylindrical stub with an outer featured surface. With this embodiment, the coupling section of the handle member is inserted within the legs of the shaft section. To hold the handle member to the shaft member in this embodiment, the handle member could have a plurality of arms resiliently depending therefrom, each provided with a head which snap fits into an annular groove provided in the shaft member.

In a further embodiment not depicted in the drawings, the shaft member has the coupling section and the handle member has the legged end. More specifically, the end of the shaft member opposite connection end is annular with an inside wall being featured to provide the coupling section. In this embodiment, the handle member terminates in a short stub from which a plurality of legs resiliently depend. This handle stub may then be inserted into the annulus at the end of the shaft member so that the featured outer surface of the legs face the features of the coupling section of the shaft member. To hold the handle member to the shaft member in this embodiment, the annular end of the shaft member could have a plurality of arms resiliently depending therefrom, each provided with a head which snap fits into an annular groove provided at the base of the stub of the handle member.

Other modifications will be apparent to those skilled in the art and, therefore, the invention is defined in the claims.

What is claimed is:

1. A torque limiting handle assembly, comprising:
    an annular handle member that is manually rotated about a rotational axis and includes a bore defined by an interior surface of the handle member that extends through the length of the handle member coaxially with the rotational axis;
    a plurality of first undulated features disposed on the interior surface of the handle member;
    a shaft member sharing the rotational axis with the handle member and having a connection end configured to connect to a member to be torqued and an opposite legged end;
    a plurality of resiliently depending legs that extend from the perimeter of the legged end in a direction substantially parallel to the rotational axis, the legged end of the shaft member being disposed within the bore of the handle member such that the legs are within the handle member;
    a plurality of second undulated features disposed on a surface of each of the legs, the second features configured to mesh with the first features on the interior surface, each of the legs being resilient to maintain a meshing engagement of the first and second features against a reaction torque between the handle member and the shaft member that is less than a threshold, and each of the legs being flexible to yield to a force applied to the legs by an interaction between the first and second features that results from the reaction torque between the handle member and the shaft member being equal to or greater than the threshold such that rotation of the handle member with respect to the shaft member is enabled.

2. The handle assembly of claim 1, the first features on the interior surface comprise first undulations in the surface.

3. The handle assembly of claim 2, wherein the second features disposed on the surface of each of the legs comprise second undulations and the second undulations of each leg extend within the first undulations of the interior surface.

4. The handle assembly of claim 3, wherein the handle member has a first shoulder and the shaft member has a second shoulder that seats against first shoulder in order to locate the legs within the handle member.

5. The handle assembly of claim 4, wherein the shaft member is restrained from withdrawal from the handle member by a cap attached to the handle member and capping the legged end of the shaft member.

6. The handle assembly of claim 1, wherein the handle member comprises a unitary single piece and wherein the shaft member comprises a unitary single piece.

7. The handle assembly of claim 6, wherein the cap comprises a unitary single piece.

8. A torque limiting handle assembly, comprising:
    a manually rotatable handle having a bore extending along a rotational axis of the handle, the handle including a coupling section on an interior surface, the coupling section extending a distance along the rotational axis and having a first undulated surface feature;
    an elongate shaft member disposed at least partially within the bore of the handle and coaxially with the rotational axis of the handle member;
    a second undulated surface feature disposed on the shaft member and configured to removeably mate with the first surface feature to obstruct rotation of the handle with respect to the shaft member when mated;

a plurality of resilient legs extending from an end of the shaft member and arranged about and substantially parallel to the rotational axis, each of the plurality of legs including the second surface feature, each of the legs being resilient to maintain a mating relationship between the first and second surface features and a rotational orientation between the handle and shaft member against a reaction torque that is applied between the handle and shaft member and that is less than a threshold, and each of the legs being flexible to yield to a reaction torque that is greater than the threshold to deflect the legs away from the first surface feature to un-mate the first and second surface features and allow rotation of the handle with respect to the shaft member.

9. The handle assembly of claim 8, wherein the first surface features are disposed along the interior surface of the handle and comprise a plurality of first undulations aligned substantially parallel to the rotational axis in the coupling section.

10. The handle assembly of claim 9, wherein the second surface features are disposed on a surface of each leg opposed to the coupling section and comprise a plurality of second undulations aligned substantially parallel to the rotational axis and the second undulations of each leg mate with the first undulations of the coupling section.

11. The handle assembly of claim 4, wherein the coupling section extends around the legs.

12. The handle assembly of claim 10, wherein the shaft member further comprises a shoulder against which the handle seats to locate the legs within the coupling section.

13. The handle assembly of claim 12, wherein the handle member is annular having open ends, the shaft member is partially disposed within the handle member and projects through one open end of the handle member such that a connection end of the shaft member projects beyond the open end of the handle member.

14. The handle assembly of claim 13, wherein the shaft member is restrained from withdrawal from the handle member through the open end of the handle member by the shoulder and through a second opposite open end of the handle member by a cap capping the second open end.

15. The handle assembly of claim 14, wherein the handle member comprises a unitary single piece and wherein the shaft member comprises a unitary single piece.

16. The handle assembly of claim 15, wherein the cap comprises a unitary single piece.

* * * * *